United States Patent [19]

Guddee

[11] Patent Number: 5,052,651

[45] Date of Patent: Oct. 1, 1991

[54] FASTENER FOR PORTABLE EQUIPMENT

[75] Inventor: Robert Guddee, San Marcos, Calif.

[73] Assignee: Mardesich Enterprises

[21] Appl. No.: 492,663

[22] Filed: Mar. 13, 1990

[51] Int. Cl.[5] ........................ E05B 73/00; F16M 13/00

[52] U.S. Cl. .................................... 248/552; 248/553; 248/505; 248/205.3; 70/58

[58] Field of Search ................................ 248/551-553, 248/505, 499, 500, 205.3, 503; 70/57, 58, 232

[56] References Cited

U.S. PATENT DOCUMENTS

| | | | |
|---|---|---|---|
| 3,850,392 | 11/1974 | Gassaway | 248/553 |
| 3,945,227 | 3/1976 | Reiland | 70/58 |
| 4,353,521 | 10/1982 | Webb | 70/58 X |
| 4,453,692 | 6/1984 | Le Doux et al. | 70/58 X |
| 4,473,176 | 9/1984 | Harper | 70/58 X |
| 4,585,202 | 4/1986 | Parsekian | 248/553 |
| 4,634,009 | 1/1987 | Gassaway | 70/57 X |
| 4,691,891 | 9/1987 | Dionne | 248/551 |
| 4,696,449 | 9/1987 | Woo et al. | 248/553 |
| 4,733,840 | 3/1988 | D'Amore | 70/58 X |
| 4,884,420 | 12/1989 | Finkel et al. | 70/58 |

*Primary Examiner*—Gary L. Smith
*Assistant Examiner*—Suzanne L. Dino
*Attorney, Agent, or Firm*—Bernard L. Kleinke; William P. Waters; Jerry R. Potts

[57] ABSTRACT

A security fastener for helping to prevent the unauthorized removal of table top equipment, such as a personal computer, from its supporting surface, includes a base frame, which receives the equipment to be protected. A double-sided adhesive tape secured to the underside of the base frame affixes the frame to the a supporting surface. A bar moves between an opened and a closed position to permit the equipment to be removed from, and installed within the device. An inventive lock assembly is disposed within the base frame and fastens the bar in its closed locking position to secure the bar in place. The base frame is fastened together by connecting pins to enable the security fastener to be assembled in a convenient manner, and the lock assembly is similar in its external appearance to the connecting pins for concealing the locking assembly from view and for providing the fastener with an aesthetically pleasing appearance.

19 Claims, 5 Drawing Sheets

FASTENER FOR PORTABLE EQUIPMENT

TECHNICAL FIELD

This invention relates in general to a security fastener, and it more particularly relates to a security fastener for helping prevent the unauthorized removal of table top equipment, such as personal computers, computer printers, typewriters, and the like, from a supporting surface.

BACKGROUND ART

There have been many different types and kinds of safety fasteners for helping to prevent the unauthorized removal of table top equipment, such as personal computers, computer printers, typewriters and the like, from a supporting surface, such as a desk top, table top, or the like. One such equipment fastener is disclosed in copending U.S. patent application Ser. No. 07/492,737, which was filed concurrently with this application, and entitled "Equipment Security Apparatus and Kit and Method of Using Same," and the disclosure of which is incorporated herein by reference.

Conventional equipment fasteners are usually constructed of a rigid material, such as steel or aluminum, to provide the necessary structural integrity, in an attempt to prevent the breaking or destruction of the fastener, by an unauthorized person intending to take the valuable equipment from its resting place. For example, the copending U.S. patent application Ser. No. 07/492,718, discloses a security fastener having a frame which secures the equipment to be protected, to its supporting surface. The frame is constructed of welded steel, for the purpose of providing the necessary structural integrity to prevent the breaking or destruction of the frame should an unauthorized person attempt to remove the equipment secured therewithin.

While such a welded construction may achieve its intended purpose, it requires an expensive and time consuming hand welding operation to produce the desired structurally-strong mechanical joints or bonds between adjoining frame members of the security fastener. Such hand operations are expensive and time consuming, since the welder must use care in welding the various frame members together to provide the necessary structural integrity. In addition, in order to make the fastener aesthetically pleasing in appearance, the welded joint should be ground down to be less noticeable. Such a grinding operation is also expensive and time consuming.

Therefore, it would be highly desirable to have a new and improved security fastener construction, which would eliminate, if not substantially reduce, welding and grinding operations, and yet would retain structural integrity and be aesthetically pleasing in appearance.

Such a construction should be relatively light in weight for facilitating the transportation of the security fastener by a user in an easy and convenient manner, and yet substantially structurally strong and rigid, to maintain structural integrity for preventing unauthorized removal of the secured equipment therefrom. Also, in order to manufacture the fastener, in a cost effective manner, according to modern high speed manufacturing techniques, such a fastener construction should be able to be assembled quickly and efficiently in a relatively cost effective manner.

Conventional equipment security fasteners also by the very purpose of their function, typically include some form of attachment or locking arrangement to secure or fasten the equipment to be protected therewithin, for preventing unauthorized removal of the portable equipment. For example, reference may be made to the following U.S. Pat. Nos. 3,850,392; 4,065,083; 4,655,429. 4,691,891; and 4,733,840.

U.S. Pat. No. 4,733,840 discloses a locking arrangement which includes a security plate fixed to the equipment to be protected, and a highly visible lock and security cable for attaching the plate to a stationary surface for preventing the unauthorized taking of the equipment. In this configuration, such a highly visible locking arrangement may be very effective in deterring theft in a factory or school, for example, because the obvious appearance of the lock and cable may tend to discourage a thief from attempting to remove the valuable table top equipment. However, in other settings, such as in an office or executive suite, a bulky lock and cable could be very displeasing aesthetically, and would distract from the appearance of the equipment being secured.

Therefore, it is desirable to have a locking arrangement, whereby the unit to be protected could be easily removed by an authorized person from the security fastener affixing the unit to its supporting surface, and yet have a less apparent locking arrangement, so as not to distract from the appearance of the equipment being employed in a more formal environment, such as in an office or executive suite.

Therefore, it would be highly desirable to have a new and improved security fastener, which enables the equipment being protected to be easily removed by an authorized person, without the use of ugly locks, such as a padlock. Thus, the user could remove the equipment for repair or replacement purposes, and then could again secure the repaired or replacement equipment to the supporting surface in a fast and efficient manner.

DISCLOSURE OF INVENTION

Therefore, the principal object of the present invention is to provide a new and improved equipment security fastener, which is aesthetically pleasing in appearance, and which is structurally strong.

Another object of the present invention is to provide such a new and improved equipment security fastener, wherein the fastener is relatively light in weight, and employs a secure locking arrangement, which is relatively unnoticeable and thus not objectionable in its use in more formal environments.

Briefly, the above and further objects of the present invention are realized by providing a security fastener for helping to prevent the unauthorized removal of table top equipment, such as a personal computer or other similar equipment from its supporting surface.

The security fastener includes a base frame for receiving the equipment to be protected, and a double-sided adhesive tape affixed to the underside of the base frame secures the frame to a supporting surface. A bar helps secure the equipment within the frame, and is movably mounted between an opened and a closed position to permit the equipment to be removed from and installed within the frame. A locking assembly is disposed within the base frame to fasten the bar in a fixed position to secure the bar in place.

The base frame members are fastened together by connecting pins to enable the fastener to be assembled in a convenient mass production manner, and the lock assembly is similar in its external appearance to the connecting pins for concealing the locking assembly from view, and for providing the fastener with an aesthetically pleasing appearance.

In one form of the invention, at least a portion of the base frame is made from a light weight cast or extruded bar stock having an aesthetically pleasing bead-like longitudinally extending rib extending its entire length and being adapted to receive the connecting pins at the end edges thereof. The bar stock is structurally strong, and yet may be cut into appropriate lengths and shapes for facilitating the construction of the security fastener in a rigid configuration.

The rigid bar stock of the present invention also is readily adaptable to be formed into a receiving body for a novel lock assembly used to secure the bar in its closed equipment restraining position. The lock assembly includes an access pin which is substantially visually indistinguishable from the connecting pins securing the base frame members together. Thus, a highly desirable effect is achieved, since the access pin and body of the lock disguise the inventive lock assembly, and yet enable an authorized person to release readily and conveniently the lock for inserting and removing the equipment from the fastener.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
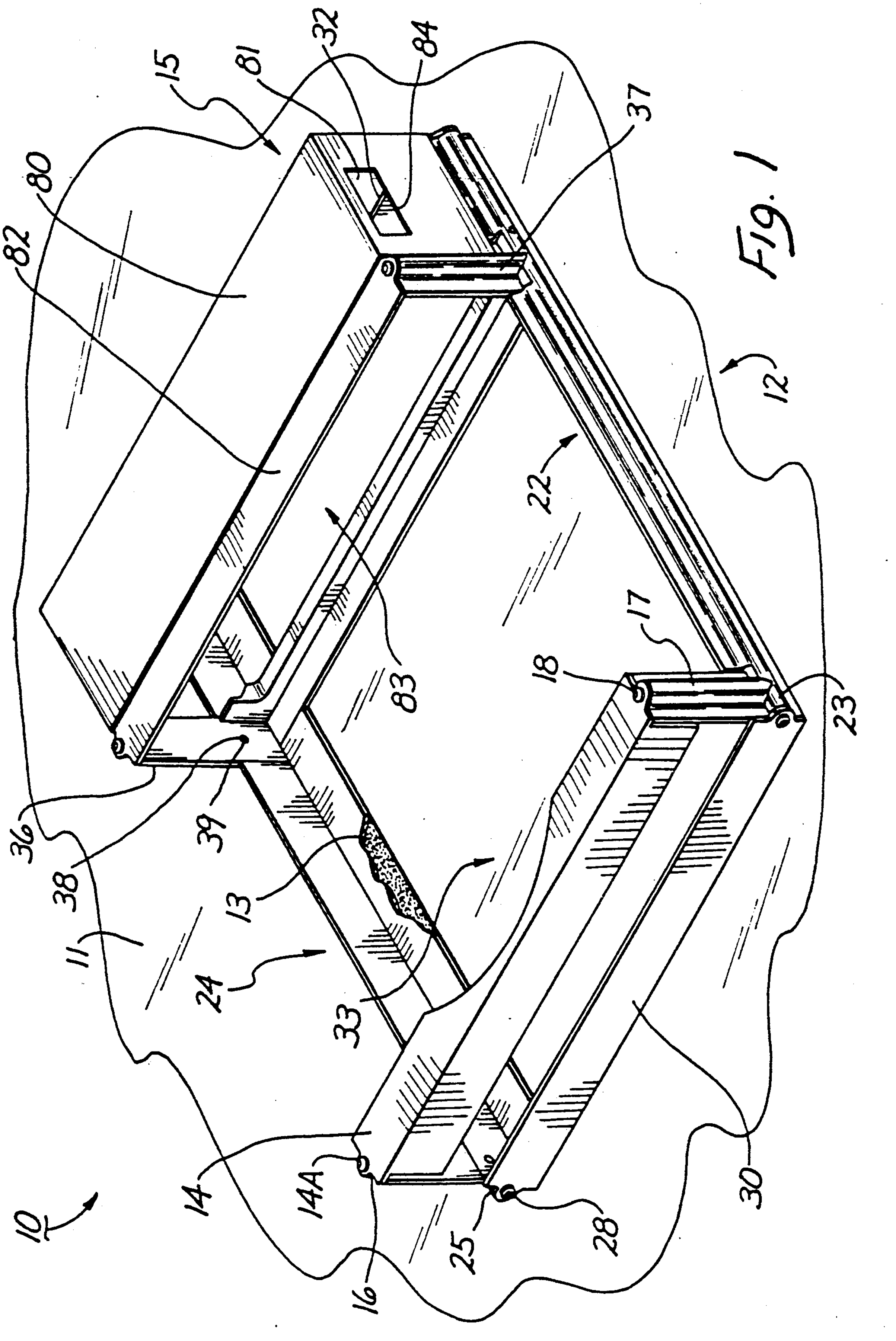
FIG. 1 is a partially cut-away pictorial view of a equipment security fastener, which is constructed in accordance with the present invention, being illustrated secured to a supporting surface.

Referring now to the drawings, and more particularly to FIG. 1 thereof, there is shown an equipment security fastener 10, which is constructed in accordance with the present invention. The equipment fastener 10 is adapted to be used according to the method of the present invention, for securing, removably, equipment (not shown) to be protected, to a firm supporting surface 11, such as a table top, desk top or any other convenient surface, for supporting the equipment from below. The equipment to be protected by the portable equipment fastener 10 is a computer monitor (not shown) having an integrally formed personal computer (not shown). However, it is to be understood that other types and kinds of equipment may also be protected. For example, typewriters, computer printers, facsimile machines, and others, can also be protected by the method and fastener of the present invention.

The portable equipment fastener 10 generally comprises a base frame shown generally at 12, for receiving and securing the equipment (not shown) therein, to the supporting surface 11. A double-sided adhesive tape, such as the tape 13 is attached to the underside of the base frame 12, for fastening, removably, the frame 12 to the supporting surface 11, so that the frame 12 (and the equipment secured therein) may not be removed by an unauthorized person, as is more fully described in copending U.S. patent application Ser. No. 07/492,737, filed concurrently with the filing of this application, and incorporated herein by reference. However, according to an inventive removal method disclosed in the last-mentioned patent application, the base frame can be removed from the supporting surface, without any substantial damage to it.

A pair of upstanding rods or posts 16 and 17 extend between the base frame 12 and a pivotally mounted locking bar 14 to form part of a securing arrangement which partially surrounds a portion of the front of the equipment to be protected. The bar 14 is pivotally mounted to the top edge of the post 16 at connecting pin 14A, and extends therefrom horizontally to the top edge of the post 17. The bar 14 can be pivoted about the axis of the post 16 between a closed position (FIG. 1) and an opened position (not shown) extending horizontally forwardly at right angles to its illustrated closed position. A lock fastener or assembly 18 is mounted in the post 17 for detachably connecting the free end of the bar 14 to the post 17 to prevent an unauthorized person from removing the equipment from the base frame 12. In accordance with one aspect of the invention, the external appearance of lock assembly 18, as shown in FIG. 1, appears to be similar to the connecting pin 14A and the other connecting pins of the frame 12. Thus, an unauthorized person is not alerted to the presence of the lock assembly, and the resulting appearance of the security fastener 10 is aesthetically pleasing.

A second pair of upstanding rods or posts 36 and 37, parallel and spaced apart from the posts 16 and 17, extend between the base frame 12 and a housing 15 to form another part of the securing arrangement, to surround partially a portion of the rear of the equipment to be protected. The housing 15 includes a U-shaped cover 80 which is adapted to be attached to the base frame 12 and the posts 36 and 37. A pair of mounting holes, such as the hole 38, in the cover is adapted to receive a metal screw 39 for mounting purposes. The bar 14 and the housing 15 cooperate together to secure, removably, the equipment within the base frame 12.

Figure 8:
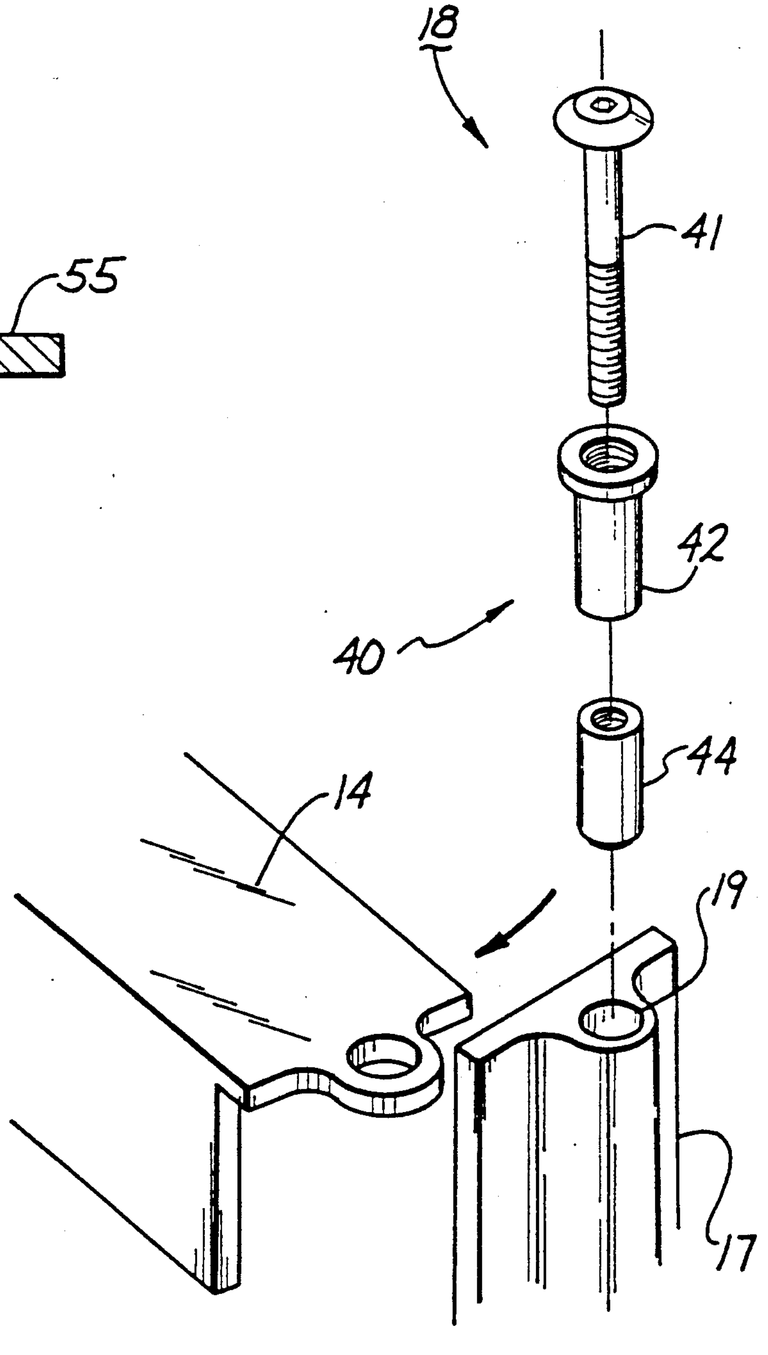
FIG. 8 is an enlarged fragmentary, exploded pictorial view of the locking arrangement of FIG. 1, illustrating the parts of the lock assembly.

As best seen in FIG. 8, in order to mount the lock assembly 18 in the post 17, the post 17 includes an elongated bore 19 for receiving a lock assembly 40 therein. The lock assembly 40 includes a threaded access bolt 41 for covering a removable lock sleeve 42 and the access to a lock seat 44, as more fully described in copending U.S. patent application Ser. No. 07/492,708, filed concurrently herewith, and entitled "Security Key and Lock Assembly and Method of Using Same."

In use, in order to secure the equipment to be protected with the fastener 10, the user removes the access bolt 41 and lock sleeve 42, grasps and pivots the bar 14 forwardly in a clockwise direction as viewed downwardly in plan view, to enable the equipment to be placed within the fastener 10. The equipment is then placed in the fastener 10 as more fully described in the last-mentioned copending U.S. Pat. application.

After the equipment is placed in the fastener 10, the user grasps and pivots the bar 14 in a counterclockwise direction as viewed downwardly in plan view, until it is returned to its locking position (FIG. 1). The lock sleeve 42 and access bolt 41 are then inserted in the bore 1 to lock the bar 14 to the post 17.

Figure 3:
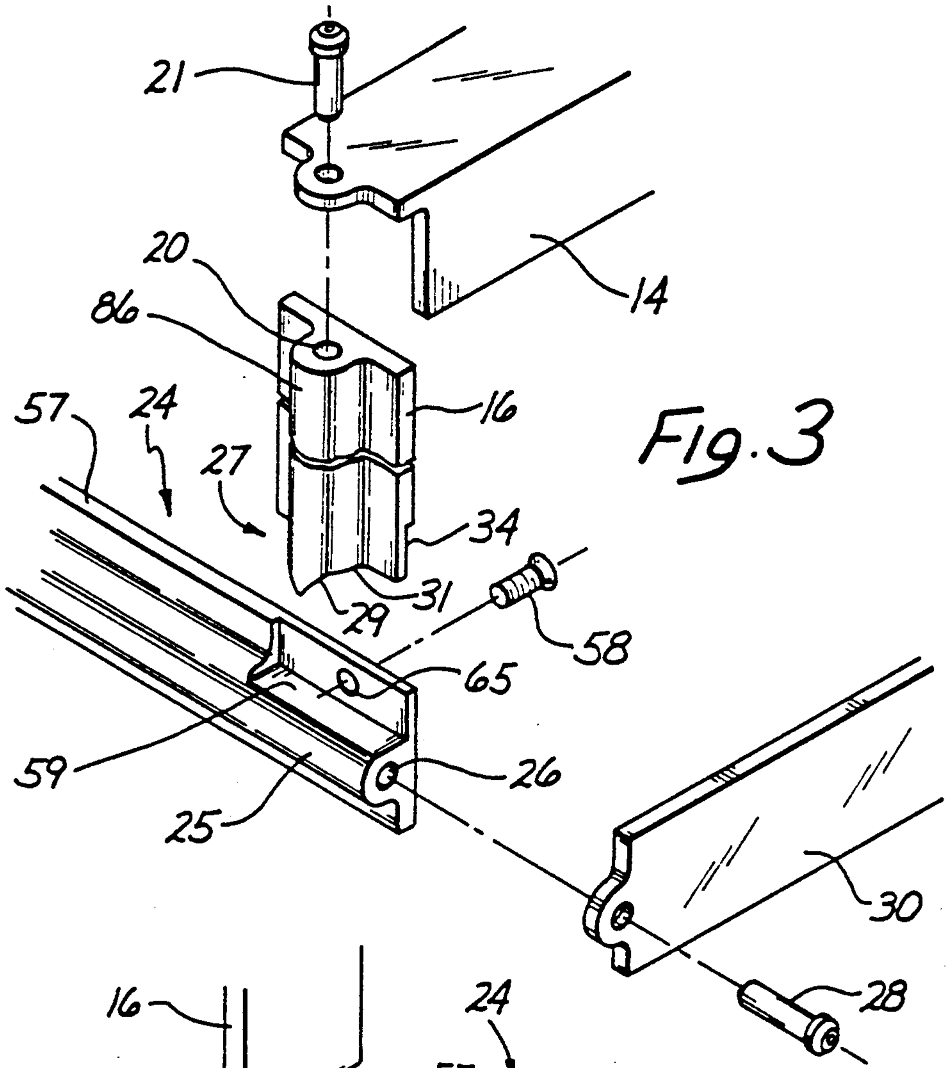
FIG. 3 is an enlarged fragmentary, exploded pictorial view of a portion of the fastener of FIG. 1.
Figure 4:
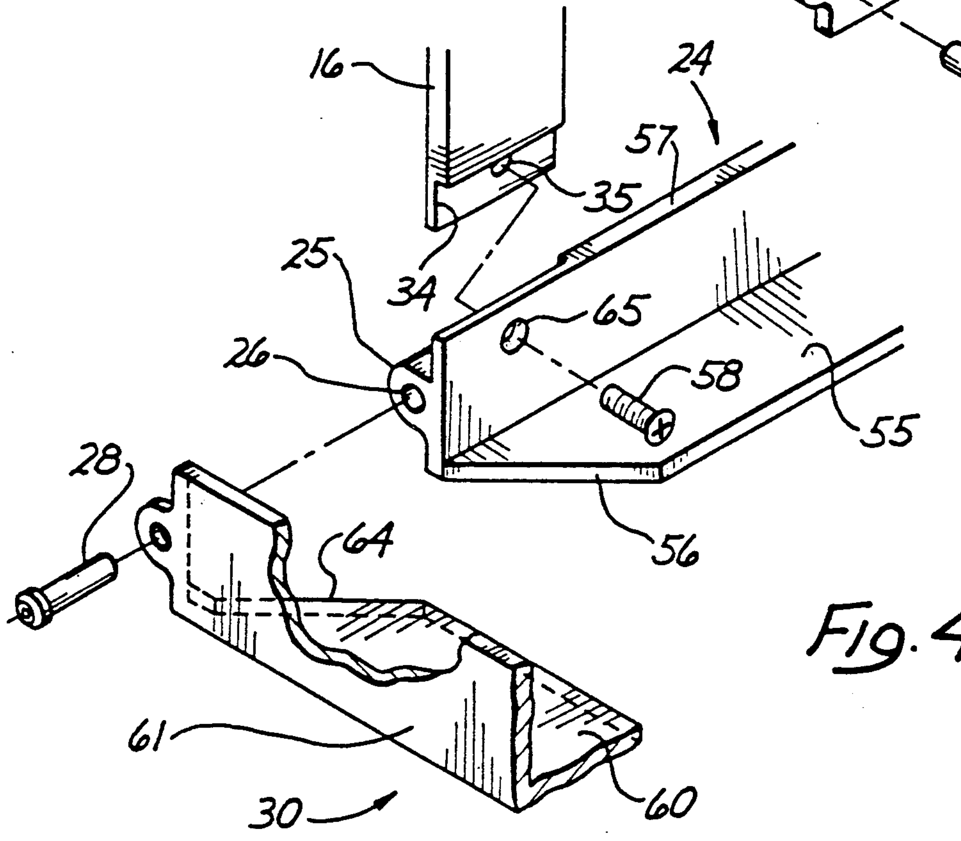
FIG. 4 is an enlarged fragmentary, exploded partially cut away sectional pictorial view of another portion of the fastener of FIG. 1.

Considering now the portable equipment fastener 10 in greater detail with reference to FIGS. 1, 3 and 4, the base frame 12 generally comprises a pair of L-shaped elongated side rails 22 and 24 each having an aesthetically pleasing longitudinally-extending, centrally disposed bead-like protuberance or rib, such as the ribs 23 and 25 respectively, which extend throughout their entire longitudinal length. The ribs serve to rigidify or stiffen the member. Also, the ribs, such as rib 25 (FIGS. 3 and 4), are each bored at both its, terminal ends with an opening or hole, such as the hole 26. The holes in the ribs, such as the hole 26, are each dimensioned to receive in a tight friction-like non-removable fit, a connecting pin, such as the pin 28 as will be described hereinafter in greater detail. The pin 28 is generally similar to the pin 14A, and the other like pins for the frame 12. Thus, the frame 12 can be assembled in a rapid manner, by inserting the pins in a conventional manner.

The base frame 12 also includes a pair of L-shaped elongated cross bar members 30 and 32 for interconnecting the rails 22 and 24 together to define a generally rectangular open space, shown generally at 33. The space 33 is complementarily shaped and dimensioned to the bottom portion of the portable equipment to be protected so that the entire bottom portion of the equipment may be received within the space 33. As the cross bar members 30 and 32 are substantially similar to one another, only cross bar member 30 will be described hereinafter in greater detail.

Figure 2:
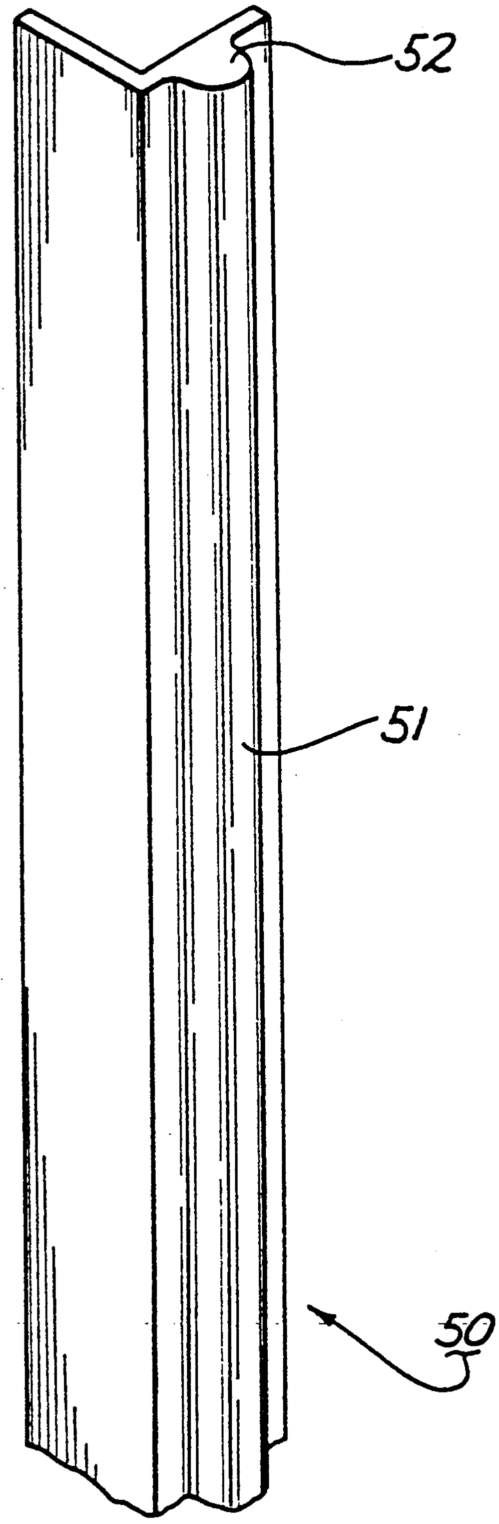
FIG. 2 is a fragmentary, enlarged pictorial view of a bar stock used in the construction of the security fastener of FIG. 1.

The side rails 22 and 24, as well as the cross bar members 30 and 32, are composed of a suitable light weight, thermally conductive, rigid material, such as metal. Aluminum is the preferred material as it can be easily operated upon by conventional cutting, grinding, and drilling techniques for the purpose of manufacturing the fastener 10. In this regard, aluminum can also be extruded or cast to provide a universally adaptable bar stock 50 having a protuberance or rib, such as the rib 51 (FIG. 2) for forming the rails 22 and 24 and upstanding posts 16, 17, 36 and 37 of the fastener 10.

In order to facilitate the assembly of the fastener 10 in a quick and relatively easy and efficient manner to form a structurally strong configuration, the bar 14, the housing 15, and the cross bar members 30 and 32 each include a pair of integrally formed outwardly extending flanges or tabs, such as the tab 34 (FIGS. 3 and 4). Each of the tabs, such as the tab 34 is complementarily shaped and dimensioned to correspond to an end portion of the bar stock 50, such as the end portion 52.

Considering now the side rails 22 and 24 in greater detail with reference to FIGS. 1 and 3-6, the rails, such as rail 24, includes a base member 55 for resting on the supporting surface 11. The base member 55 terminates in an integrally formed upright leg member 57 that is disposed substantially at 90° to the base member 55. The base member of each rail, such as the base member 55, is mitered at its terminal ends such as the end 36 (FIG. 4) approximately 45° to permit the rail 22 to form a mitered joint (not shown) with the cross bar members 30.

Figure 6:
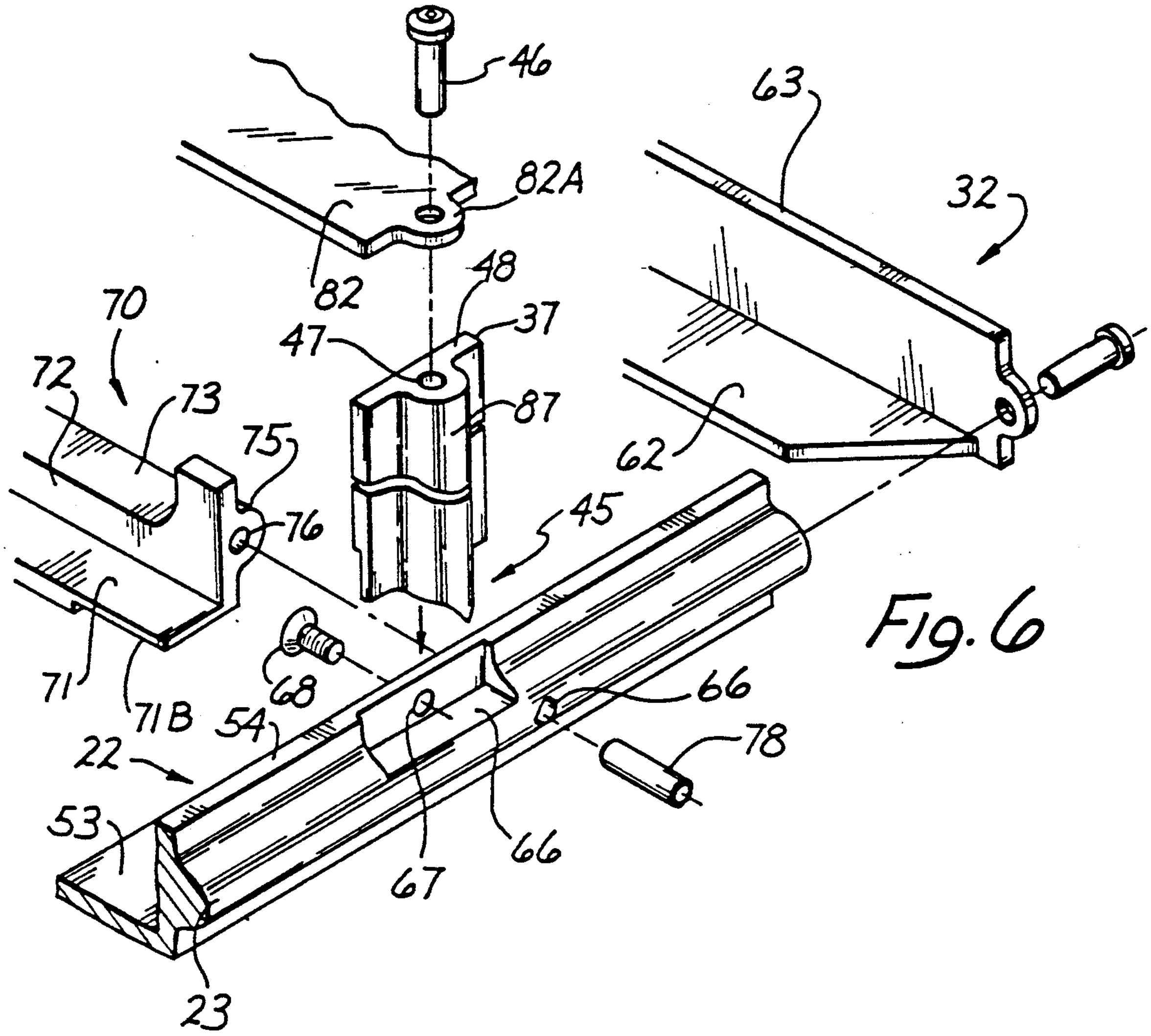
FIG. 6 is an enlarged fragmentary, exploded partially sectioned pictorial view of yet another portion of the fastener of FIG. 1.
Figure 5:
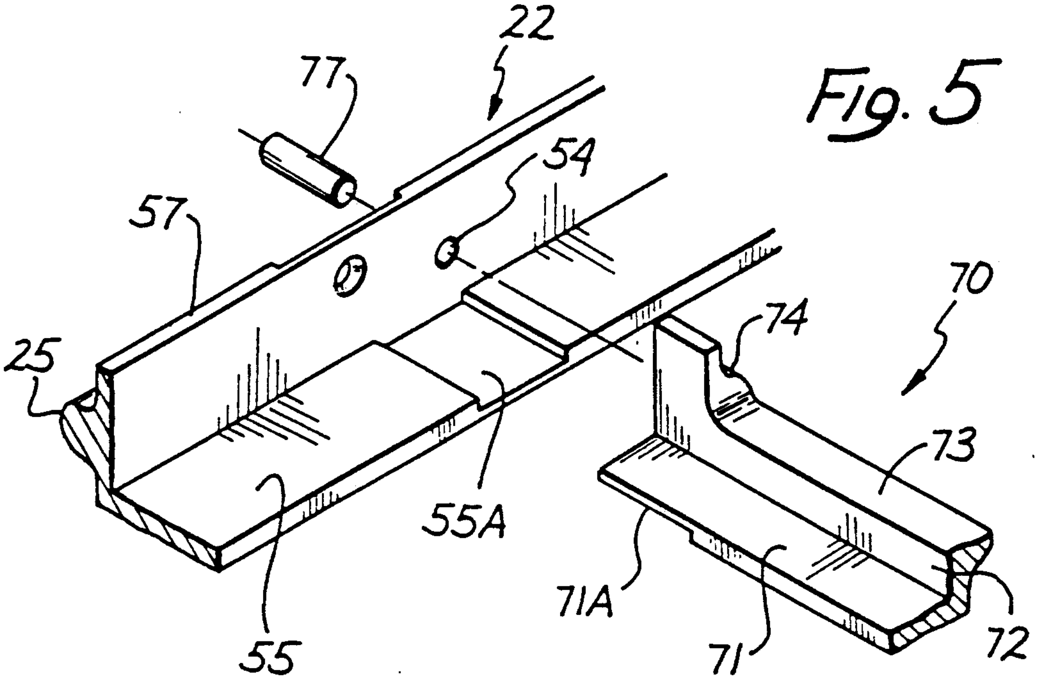
FIG. 5 is an enlarged fragmentary, exploded partially sectioned pictorial view of still another portion of the fastener of FIG. 1.

Considering now the rail member 22 in greater detail with reference to FIGS. 5 and 6, the rail member 22 is similar to rail member 24 and includes a base member 53 for resting on the supporting surface 11. The base member 53 terminates in an integrally formed upright member 54 that extends upwardly therefrom at approximately 90° for defining a confinement wall to contain the portable equipment to be protected within the space 33.

Considering now the cross bar members 30 and 32 in greater detail with reference to FIGS. 1, 4 and 6, each of the cross bar members 30 and 32 include a base member, such as the base members 60 and 62, which terminate in an integrally formed upright member, such as the upright members 61 and 63. The upright members, 61 and 63 are disposed substantially at 90° to the base members 60 and 62 respectively. The base member of each cross bar member, such as the base member 60, is mitered at approximately 45° at each of its terminal ends such as the end 64 (FIG. 4), to permit the cross bar members 30 and 32 to form a mitered joint (not shown) with the rail 24.

Considering now the upstanding posts 16, 17, 36 and 37 in greater detail with reference to FIGS. 1, 3, 6 and 7, each of the posts, such as the posts 16 and 37 are formed from aluminum bar stock, such as the bar stock 50. Each of the posts, such as the posts 16 and 37 includes an aesthetically pleasing bead-like protuberance or rib, such as the ribs 86 and 87, respectively. Each of the ribs, such as the ribs 86 and 87 include a bore or opening such as the openings 20 and 45 respectively for receiving a connecting pin, such as the pins 21 and 46, respectively for assembly purposes.

Figure 7:
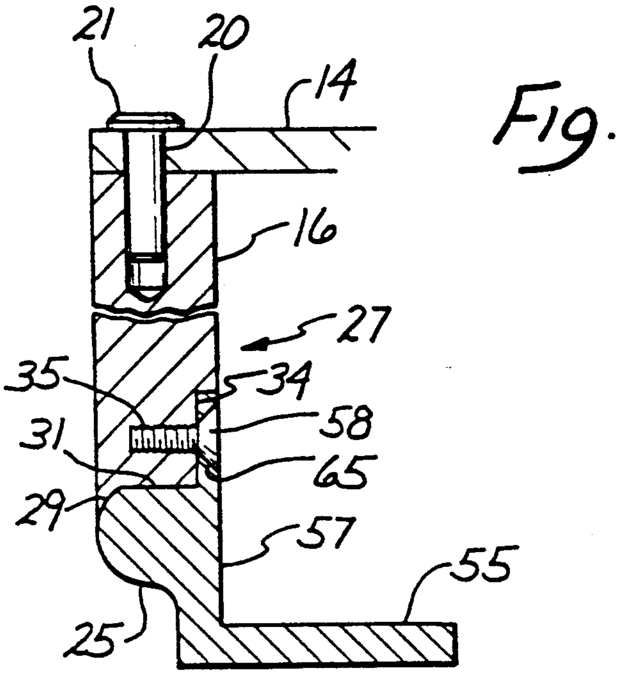
FIG. 7 is a greatly enlarged side elevational sectional view of a further portion of the fastener of FIG. 1.

As best seen in FIG. 7, the lower end of each of the posts such as the post 16, is complementarily shaped to be mounted to one of the rails, such as the rail 24. In this regard, the lower end of each post, such as the lower end 27 of the post 16 includes a lip having a generally quarter circle segment 29 and a straight segment 31 that conform to the shape of the rib 25. The lower end 27 also includes an inverted L-shaped notch portion 34 that conforms to the upper portion of the rail 57 as will be explained hereinafter in greater detail.

In order to mount the upright post 37 to the rail member 22, an L-shaped slot 66 is disposed nearer one terminal end of the rail 22 than the other terminal end. The slot 66 is adapted to receive the lower portion 45 of the post 37 and includes a centrally disposed hole 67 that is dimensioned to receive a metal screw, such as the screw 68. In this regard, the screw 68 secures the post 37 to the rail 22.

In order to permit the posts 16 and 36 and 17 and 37 to be mounted to the rails 22 and 24 respectively, each of the rails, such as rail 24 includes an L-shaped slot, such as the slot 59 for matingly receiving the lower end 27 of the post 16. The lower end of the post 16, includes a threaded bore 35 for receiving a metal screw 58 to secure the post 16 and rail 24 together. A countersunk hole, such as the hole 65 is centrally disposed in the slot 65 and extends through the upstanding portion of the slot 59 for permitting the metal screw 58 to be received within the threaded bore 35 when the notch portion 34 is positioned in mating engagement with the slot 59.

Considering now the housing 15 in greater detail with reference to FIGS. 1, 5 and 6, the housing 15 includes an L-shaped cross rail member 70 that extends between the rails 22 and 24 and a generally U-shaped cover 80, which is adapted to be secured to the upstanding posts 36 and 37. The cross rail member 70 and the cover 72, cooperate together to confine and cover the rear portion of the equipment to be protected.

Considering now the cross rail member 70 in greater detail with reference to FIGS. 1, 5 and 6, the cross rail member 70 is composed of bar stock, such as the bar stock 50. The cross rail member 70 has a sufficient length to extend between the rails 22 and 24 and to engage their entire base member portions 53 and 55 respectively. The cross rail member 70, includes a base member 71 that terminates in an integrally formed upstanding member 72 that is disposed at approximately 90° to base member 71. The underside of the member 71 is adapted with a strip of double sided adhesive tape (not shown) that is substantially similar to tape 13 for further bonding the base member 71 to the supporting surface 11.

The upstanding member 72 includes a centrally disposed L-shaped elongated slot 73 which permits the connectors of the equipment to be protected to be received under the cover 80. The slot 73, terminates in a pair of ribs 74 and 75 that are disposed on opposite ends of the cross rail 70. Each of the ribs 74 and 75 includes a bore, such as the bore 76, for receiving a securing pin, such as the pins 77 and 78. Pins 77 and 78 secure fixedly the cross rail member 70 between the rail members 22 and 24 respectively. In this regard, each of the rail members 22 and 24 include a hole, such as the holes 54 and 66 respectively for receiving the pins 77 and 78 respectively.

In order to permit the cross rail member 70 to engage matingly the rails 22 and 24 respectively, the base member 71 includes a pair of L-shaped notch portions 71A and 71B. Notch portions 71A and 71B are disposed on opposite ends of the base member 71 respectively. The rails 22 and 24 include a pair of U-shaped grooves, such as groove 55A, which is complementarily shaped and dimensioned to receive the notch portion 71A.

Considering now the cover 80 in greater detail with reference to FIG. I, the cover 80 is generally U-shaped having an integrally formed rear portion 81 for preventing access to the connectors of the equipment to be protected. A front portion 82 of the cover terminates in a lip defining an opening shown generally at 83 for receiving and surrounding a portion of the rear portion of the equipment to be protected. An opening 84 is disposed on the right side of the cover 80 for permitting the connecting cables (not shown), such as a power cable, to have access to the connectors of the equipment when the rear portion of the equipment is surrounded by the cover 80.

Considering now the front 82 of the cover 80 in greater detail with reference to FIGS. 1 and 6, the front 82 includes a pair of oppositely disposed flanges or tabs, such as the tabs 82A that is complimentarily shaped and dimensioned to the terminal end portion 48 of the upstanding post 37. The tab 82A includes a centrally disposed hole 85 for receiving a connecting pin, such as the connecting pin 46 (FIG. 6) to secure the cover 80 to the upstanding post 37.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A fastener for protecting portable equipment, comprising:

frame means for defining a receiving space for the equipment to be protected, said receiving space being complementarily shaped to the portable equipment;

access means for defining an entranceway to said receiving space, said access means including a single locking bar movably mounted for opening and closing said entranceway and for confining the portable equipment within said receiving space when said bar is disposed in its closed position;

securing means mounted to said frame means for locking said single locking bar in place in its closed position for fastening the portable equipment within the receiving space of said frame means in a manner to permit the locking bar to be unlocked by authorized persons only;

said frame means including an elongated rigid L-shaped member having a pair of legs, one of said legs having a substantially flat surface for facilitating the attachment of said frame means to a supporting surface, the other one of said legs having a bead-like rib extending along the entire longitudinal axis thereof for rigidifying it, said rib being a smoothly contoured, rounded centrally disposed protuberance to provide said member with an aesthetically pleasing appearance, said rib extending between its pair of opposite terminal ends;

said frame means including another elongated rigid member having means defining an aperture therein to facilitate the joining of said members;

means defining a bore in one of said terminal ends of said bead-like rib for facilitating the joining of the end of the rib member to said other member at its aperture;

connecting means extending through said aperture into said bore for securing fixedly said members together to help facilitate rapid and convenient construction of said frame means; and fastening means secured to said substantially flat leg of at least one of said L-shaped members of said frame means for securing said frame means to said supporting surface.

2. A fastener according to claim 1, wherein said frame means includes at least two of said elongated L-shaped members and at least two of said other elongated rigid members for defining a generally rectangular area within the frame means and to confine the portable equipment within said space.

3. A fastener according to claim 2, wherein said connecting means is a connecting pin dimensioned to be received within said bore in a friction tight substantially non-removable manner.

4. A fastener according to claim 3, wherein each of said legs having a substantially flat surface is mitered for facilitating the formation of mitered joints with adjacent members; and wherein each of said other elongated rigid members includes a base portion, said base portion also being mitered for facilitating the formation of mitered joints with the adjacent flat leg portions of said L-shaped members.

5. A fastener according to claim 1, wherein said frame means including a) pair of side rail members wherein each side rail member includes a bead-like rib extending along the longitudinal axis thereof; b) at least two cross rail members for extending between said ride rail members and c) a set of upstanding post members for defining said receiving space;

said side rail members, said cross rail members and said upstanding post members each including a plurality of holes for facilitating the construction of said base frame means into the fastener for the portable equipment; and connecting means for extending through said holes for securing said side rail members, said cross rail members and said upstanding post members together fixedly.

6. A fastener for equipment, comprising:

base frame means for defining a receiving space for the equipment to be protected, said receiving space being complementarily shaped so the bottom portion of the portable equipment;

securing means mounted to said base frame member for fastening the portable equipment within the receiving space of said base frame means; and fastening means secured to said base frame means for securing said base frame means to a supporting surface;

wherein said base frame means includes a pair of elongated side rails and a pair of cross bar members for defining a generally rectangular area within the base frame means;

each of said side rails and each one having a base member for resting on said supporting surface and an upright member for helping to confine the portable equipment within said space;

each of said side rails including at least one bead-like rib extending along the longitudinal axis thereof, said rib including at least one bore adapted to receive connecting means for securing at least one of said rails and at least one of said cross bar members together;

wherein said connecting means is a connecting pin dimensioned to be received within said bore in a friction tight substantially non-removable fit;

wherein said base member of each of the rail members is mitered for forming mitered joints with the base member of adjacent cross bar members;

said base member of each of said adjacent cross bar members also being mitered for forming mitered joints with the base member of adjacent rail members; and wherein each of said cross bar members includes a pair of oppositely disposed outwardly extending flanges, each of said flanges having a centrally disposed hole therein for receiving one of said connecting pins to secure said cross bar member to said rail member.

7. A method for making a security fastener according to claim 6, further comprising:

forming a housing; and attaching said housing to an end portion of at least two of said rigid members.

8. A method for making a security fastener according to claim 7, further comprising:

using a locking device;

inserting the locking device in a hole in one of said bead-like ribs.

9. A method for making a security fastener according to claim 8 further comprising:

using an apertured bar;

attaching said apertured bar pivotally between a pair of said rigid members.

10. A fastener for equipment, comprising:

base frame means for defining a receiving space for the equipment to be protected said receiving space being complementarily shaped to the bottom portion of the portable equipment;

securing means mounted to said base frame means for fastening the portable equipment within the receiving space of said base frame means; and fastening means secured to said base frame means for securing said base frame means to a supporting surface;

wherein said base frame means includes a pair of elongated side rails and a pair of cross bar members for defining a generally rectangular area within the base frame means;

each of said side rails and each of said cross bar members being generally L-shaped and each one having a base member for resting on said supporting surface and an upright member for helping to confine the portable equipment within said space;

each of said side rails including at least one bead-like rib extending along the longitudinal axis thereof, said rib including at least one bore adapted to receive connecting means for securing at least one of said rails and at least one of said cross bar members together;

wherein said securing means includes a set of four upstanding posts, two of said posts being mounted to one of said side rails and the other two said posts being mounted to the other one of said side rails, said upstanding posts further defining said receiving space for receiving the portable equipment;

a bar pivotally mounted to one of said posts and extending to an oppositely disposed parallel spaced apart post for surrounding a portion of the portable equipment within the space of said base frame means; and a housing mounted so said side rails for surrounding another portion of the portable equipment within the space of said base frame means, said bar and said housing cooperating together to secure the portable equipment within said receiving space.

11. A fastener according to claim 10, wherein said oppositely disposed post includes a bead-like rib extending along the longitudinal axis thereof, said rib including a bore at one end thereof, said bore adapted to receive lock means therein for securing removably said bar to said oppositely disposed post.

12. A fastener according to claim 10, wherein said bar includes a pair of outwardly extending flanges, each flange having a centrally disposed hole therein for receiving said connecting means or said lock means.

13. A fastener according to claim 10, wherein said housing includes a pair of outwardly extending flanges, each flange having a centrally disposed hole therein for receiving said connecting means to secure said housing between a pair of said posts; and said housing further including a cross rail member extending between said side rail members for receiving said fastening means to secure said base frame to the supporting surface.

14. A fastener according to claim 13, wherein said fastening means is a double faced adhesive tape, one of the faces of said tape being bonded to the underside of said cross bar members, said side rail members and said cross rail member, and the other one of said faces being bonded to the supporting surface for fastening the base frame to the supporting surface.

15. A method of attaching portable equipment to be protected to a supporting surface, comprising:

using frame means having a housing at its rear end and having at its front end a lockable closure member moveable between opened and closed positions;

affixing said frame member to the supporting surface;

moving said closure member to an opened position;

placing the equipment to be protected within said receiving space;

moving said closure member to a closed position for confining the equipment to be protected within said receiving space; and locking said closure member in place.

16. A method of attaching portable equipment, according to claim 15, further comprising:

adhering one side of a double-sided adhesive tape to an underside portion of said frame; and adhering the other side of said double-sided adhesive tape to the supporting surface.

17. A method of attaching portable equipment to a supporting surface, according to claim 16, further comprising:

using a housing having an aperture therein adapted to receive at least one electrical connector for the portable equipment;

extending a terminal end of an electrical connector for the equipment to be protected through the aperture in said housing;

connecting said electrical connector to the portable equipment; and securing the equipment with said frame.

18. A method of making a security fastener, comprising:

using a group of elongated rigid members, at least some of the members being generally L shaped having a pair of legs, one of said legs having a substantially flat surface for facilitating the attachment of the member to a supporting surface, the other one of said legs having a bead-like rib extending along the longitudinal axis thereof, each one of said ribs having a bore at one distal end thereof;

cutting the ribbed rigid members to desired lengths;

extending fastening pins through holes in other ones of the members and into aligned bores in the bead-like ribs of the ribbed members to affix them together rigidly; and attaching adhesive substance to undersides of certain ones of said flat legs to facilitate attachment of the resulting fastener to a supporting surface in a removable manner.

19. A method for making a security fastener according to claim 18 further comprising:

forming a plurality of notches in said rigid members.

* * * * *

UNITED STATES PATENT AND TRADEMARK OFFICE

CERTIFICATE OF CORRECTION

PATENT NO. : 5,052,651

DATED : October 1, 1991

INVENTOR(S) : Robert Guddes

It is certified that error appears in the above-indentified patent and that said Letters Patent is hereby corrected as shown below:

Column 4, Line 66, after "Ser. No.", delete "07/492,708" and substitute therefor --07/492,718--.

Column 5, Line 14, delete "1" and substitute therefor --19--.

Column 5, Line 24, after "its", delete ",".

Column 7, Line 19, after "72", delete "that" and substitute therefor --. The member 72--.

Column 7, Line 27, after "protected", insert --,--.

UNITED STATES PATENT AND TRADEMARK OFFICE

CERTIFICATE OF CORRECTION

PATENT NO. : 5,052,651

DATED : October 1, 1991

INVENTOR(S) : Robert Guddes

It is certified that error appears in the above-indentified patent and that said Letters Patent is hereby corrected as shown below:

Column 9, Line 23, after "shaped", delete "so" and substitute therefor --to--.

Column 9, Line 25, after "frame", delete "member" and substitute therefor --means--.

Column 9, Line 35, after "each", insert --of said cross bar members being generally L-shaped and each--.

Signed and Sealed this

Twenty-sixth Day of July, 1994

Attest:

BRUCE LEHMAN

Attesting Officer

Commissioner of Patents and Trademarks